US011382349B2

(12) United States Patent
Huang et al.

(10) Patent No.: US 11,382,349 B2
(45) Date of Patent: Jul. 12, 2022

(54) COFFEE BEAN ROASTER

(71) Applicant: GRAND MATE CO., LTD., Taichung (TW)

(72) Inventors: Chung-Chin Huang, Taichung (TW);
Chin-Ying Huang, Taichung (TW);
Hsin-Ming Huang, Taichung (TW);
Hsing-Hsiung Huang, Taichung (TW);
Yen-Jen Yeh, Taichung (TW);
Kuan-Chou Lin, Taichung (TW);
Shao-Feng Huang, Taichung (TW)

(73) Assignee: GRAND MATE CO., LTD., Taichung (TW)

( * ) Notice: Subject to any disclaimer, the term of this patent is extended or adjusted under 35 U.S.C. 154(b) by 465 days.

(21) Appl. No.: 16/516,052

(22) Filed: Jul. 18, 2019

(65) Prior Publication Data
US 2021/0015140 A1    Jan. 21, 2021

(51) Int. Cl.
*A23N 12/10*    (2006.01)
*A23N 12/12*    (2006.01)

(52) U.S. Cl.
CPC ........... *A23N 12/10* (2013.01); *A23N 12/125* (2013.01)

(58) Field of Classification Search
CPC .............................. A23N 12/10; A23N 12/125
(Continued)

(56) References Cited

U.S. PATENT DOCUMENTS 3,690,247 A * 9/1972 Van Cleven ........ A47J 37/1228
99/356
4,325,191 A * 4/1982 Kumagai ............... A23N 12/12
34/571
(Continued)

FOREIGN PATENT DOCUMENTS

CN    2457872 Y    11/2001
CN    2552350 Y    5/2003
(Continued)

OTHER PUBLICATIONS

Search report for CN201910451133.3, dated Apr. 25, 2021, Total of 2 pages.
(Continued)

*Primary Examiner* — Jimmy Chou
(74) *Attorney, Agent, or Firm* — Tracy M. Heims; Apex Juris, Pllc.

(57) ABSTRACT

A coffee bean roaster includes a machine body, a roasting drum, a heating device, and a fan module. The machine body includes a casing, a receiving trough, a container, and a partition assembly disposed inside the casing and partitioning an inside of the casing into a first chamber, a second chamber, and a third chamber. The receiving trough is disposed outside the casing and communicates with the first chamber. The container disposed in the receiving trough has mesh holes communicating with the receiving trough. The roasting drum is rotatably disposed inside the second chamber of the casing. One side of the roasting drum has through holes communicating with the third chamber. The heating device is disposed inside the second chamber for heating the roasting drum. The fan module is attached to the casing for pumping air to the outside of the casing through the first chamber and the third chamber.

9 Claims, 8 Drawing Sheets

(58) Field of Classification Search
USPC .......................................... 99/286, 450, 479
See application file for complete search history.

(56) References Cited

U.S. PATENT DOCUMENTS

| | | | | |
|---|---|---|---|---|
| 4,494,314 A * | 1/1985 | Gell, Jr. | ................. | A23N 12/08 219/502 |
| 4,602,147 A * | 7/1986 | Gell | ....................... | A23N 12/08 219/497 |
| 5,076,157 A * | 12/1991 | Satake | ................... | A23N 15/06 99/519 |
| 5,359,788 A * | 11/1994 | Gell, Jr. | ............... | A23N 12/083 219/502 |
| 5,500,237 A * | 3/1996 | Gell, Jr. | .................. | A23F 5/046 34/360 |
| 5,960,561 A * | 10/1999 | Parodi | ................... | A23N 12/08 34/218 |
| 6,036,988 A | 3/2000 | Lemme et al. | | |
| 6,250,207 B1 * | 6/2001 | Hansen | ................... | A47J 36/38 99/476 |
| 6,260,479 B1 * | 7/2001 | Friedrich | ................. | A23F 5/04 34/233 |
| 6,382,087 B1 * | 5/2002 | Iiyama | ................... | A23N 12/10 34/594 |
| 6,679,163 B1 * | 1/2004 | Su | ......................... | A23N 12/08 99/339 |
| 7,143,686 B1 * | 12/2006 | Sandolo | ................... | A23F 5/04 99/286 |
| 7,455,867 B1 * | 11/2008 | Gutwein | ............... | A47J 31/002 426/594 |
| 8,495,954 B2 * | 7/2013 | Sommacal | .......... | A23N 12/083 99/476 |
| 9,386,798 B2 * | 7/2016 | Sewell | ................. | A23N 12/083 |
| 10,039,307 B2 * | 8/2018 | Wilson | ................ | A23N 12/125 |
| 10,517,313 B2 * | 12/2019 | Tan | ........................ | G01N 21/00 |
| 2003/0023444 A1 * | 1/2003 | St. John | ............... | H04M 3/382 704/270.1 |
| 2003/0095673 A1 * | 5/2003 | Colmenarez | ............ | G10L 15/22 381/110 |
| 2004/0074400 A1 * | 4/2004 | Song | ...................... | A23N 12/10 99/483 |
| 2005/0128484 A1 * | 6/2005 | Rodrigues | ............ | G06T 11/001 356/402 |
| 2008/0089986 A1 * | 4/2008 | Song | .................... | A23N 12/125 426/466 |
| 2008/0134907 A1 * | 6/2008 | Iiyama | ................... | B01D 47/14 99/467 |
| 2009/0220645 A1 * | 9/2009 | Martinez | ................... | A23F 5/02 426/45 |
| 2010/0051602 A1 * | 3/2010 | Beardsley | ............ | A23N 12/083 219/429 |
| 2011/0253693 A1 * | 10/2011 | Lyons | ................. | F24C 15/2021 219/209 |
| 2012/0265364 A1 * | 10/2012 | Zambrano | ............. | A23N 12/08 700/300 |
| 2013/0202748 A1 * | 8/2013 | Fountain | ................... | A23F 5/08 426/115 |
| 2013/0302483 A1 * | 11/2013 | Riefenstein | ............ | G06T 7/001 426/233 |
| 2013/0344207 A1 * | 12/2013 | Ludwig | ................... | A23F 5/046 426/233 |
| 2014/0076167 A1 * | 3/2014 | Boggavarapu | .......... | A47J 31/42 99/286 |
| 2014/0146976 A1 * | 5/2014 | Rundle | ................ | H04R 1/1083 381/71.6 |
| 2014/0242239 A1 * | 8/2014 | Boggavarapu | ...... | A47J 31/3633 426/433 |
| 2014/0370181 A1 * | 12/2014 | Young | ....................... | A23F 5/46 426/595 |
| 2015/0201796 A1 * | 7/2015 | Kuempel | ............... | H04L 67/10 426/231 |
| 2015/0330640 A1 * | 11/2015 | Stork genannt Wersborg ............ A21B 3/10 99/332 |
| 2016/0066744 A1 * | 3/2016 | Baxi | ..................... | A47J 36/321 99/343 |
| 2016/0097711 A1 * | 4/2016 | Wang | ..................... | G01N 21/27 250/206 |
| 2016/0120211 A1 * | 5/2016 | Wilson | ................. | A23N 12/125 426/233 |
| 2016/0198885 A1 * | 7/2016 | Logan | ..................... | A47J 36/00 99/325 |
| 2016/0295906 A1 * | 10/2016 | Jacobsen | ................... | A23L 5/34 |
| 2017/0055542 A1 * | 3/2017 | Cameron | .................. | A23F 5/46 |
| 2017/0215451 A1 * | 8/2017 | Tan | ....................... | G01N 29/00 |
| 2017/0360242 A1 * | 12/2017 | Boggavarapu | ....... | A23N 12/125 |
| 2018/0343913 A1 * | 12/2018 | Tun | ....................... | A23N 12/125 |

FOREIGN PATENT DOCUMENTS

| | | |
|---|---|---|
| CN | 203234009 U | 10/2013 |
| JP | H09206050 A | 8/1997 |
| TW | M366909 U | 10/2009 |
| TW | M409712 U | 8/2011 |
| TW | M477166 U | 5/2014 |

OTHER PUBLICATIONS

English abstract for CN2552350, Total of 1 page.
English abstract for JPH09206050, Total of 1 page.
English abstract for CN203234009, Total of 1 page.
English abstract for CN2457872, Total of 1 page.
English abstract for corresponding document, DE202015100090 for TWM477166, Total of 1 page.
Examination report for TW108116799, dated Jan. 6, 2020, Total of 3 pages.
Search report for TW108116799, dated Jan. 6, 2020, Total of 1 page.
English abstract for TWM366909, Total of 1 page.
English abstract for TWM409712, Total of 1 page.

* cited by examiner

COFFEE BEAN ROASTER

BACKGROUND OF THE INVENTION

Technical Field

The present invention is related to coffee bean roasting, and more particularly to a coffee bean roaster.

Description of Related Art

In society, coffee is a popular drink not only for its refreshing effect, but the unique aroma is more popular among people. The coffee is a beverage brewed from coffee beans that are roasted and ground previously. The so-called roasting is a process that coffee beans are processed in a coffee bean roaster to have coffee beans ripened and then to be ground in the next step. Coffee beans of different varieties and origins have different roasting time and temperature, and consequently, the brewed coffee tastes differently.

An example of a conventional coffee bean roaster is the "Improved Bean roaster" disclosed in the Taiwan utility model patent No. TWM477166. When roasting coffee beans, a heating pipe heats a rotary drum that contains unripened coffee beans. The heat generated by the heating pipe is exhausted to the outside by an air blower and an exhaust pipe which are disposed outside the machine base. A storage barrel is disposed at one side of the machine base, wherein the storage barrel contains ripened coffee beans and communicates with the air blower through a cooling exhaust duct, such that the heat of coffee beans gathers in the storage barrel and is discharged to the outside through the air blower.

With the above structure, the same air blower can be used for discharging the heat generated in the process of roasting and post-roasting to the outside, but the design of setting the exhaust duct and the cooling exhaust duct outside the machine base makes the coffee bean roaster occupy a large space that goes against miniaturization. Furthermore, to expose the exhaust duct and the cooling exhaust duct to the outside is not aesthetic and may cause the person to be tripped by the ducts.

BRIEF SUMMARY OF THE INVENTION

In view of the above, a purpose of the present invention is to provide a coffee bean roaster without the problems of ducts being exposed outside.

The present invention provides a coffee bean roaster including a machine body, a roasting drum, a heating device and an fan module. The machine body includes a casing, a partition assembly, a receiving trough and a container. The partition assembly is disposed inside the casing and partitions an inside of the casing into a first chamber, a second chamber and a third chamber; the casing has a material outlet; the receiving trough is disposed outside the material outlet and communicates with the first chamber; and the container is disposed in the receiving trough and has a plurality of mesh holes communicating with the receiving trough. The roasting drum rotatably disposed inside the second chamber of the casing, wherein one side of the roasting drum corresponds to the material outlet and the other side of that has a plurality of through holes communicating with the third chamber. The heating device is disposed inside the second chamber for heating the roasting drum, and the fan module is attached to the casing for pumping air from the first chamber through the third chamber.

An advantage of the present invention is to partition the inside of the casing into the first chamber, the second chamber and the third chamber by the partition assembly. The first chamber communicates with the receiving trough as well as the roasting drum and the first chamber communicate with the third chamber, such that an airflow passage is formed in the casing for getting rid of the problem of exposing ducts of the conventional coffee bean roaster to the outside. A benefit of the present invention is also to miniaturization of coffee bean roasters. In addition, the same fan module not only takes away the heat of coffee beans in the container, but also directs the hot airflow in the roasting drum to the outside of the casing.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

The following illustrative embodiments and drawings are provided to illustrate the disclosure of the present invention, these and other advantages and effects can be clearly understood by persons skilled in the art after reading the disclosure of this specification.

FIG. 1 to FIG. 6 show a coffee bean roaster 100 of a preferred embodiment according to the present invention, including a machine body 10, a roasting drum 40, a heating device 50 and a fan module 60.

The machine body 10 includes a casing 12, a partition assembly, a receiving trough 132 and a container 18. In the current embodiment, the casing 12 is composed of a front board 122, a rear board 124, two first side boards 125, two second side boards 126, a top board 127 and a bottom board 128. The front board 122 has a material outlet 129 and a material inlet 131, the material outlet 129 being disposed below the material inlet 131. A discharging baffle 134 and a feeding baffle 130 are pivotally disposed on the front board 122, and a grip 136 is disposed on the discharging baffle 134. The opening or closing of the material outlet 129 is controlled by pulling or pushing the grip 136 while the opening or closing of the material inlet 131 is controlled by moving the feeding baffle 130. In addition, the front board 122 has at least one first air hole 122a (shown in FIG. 4).

Figure 3:
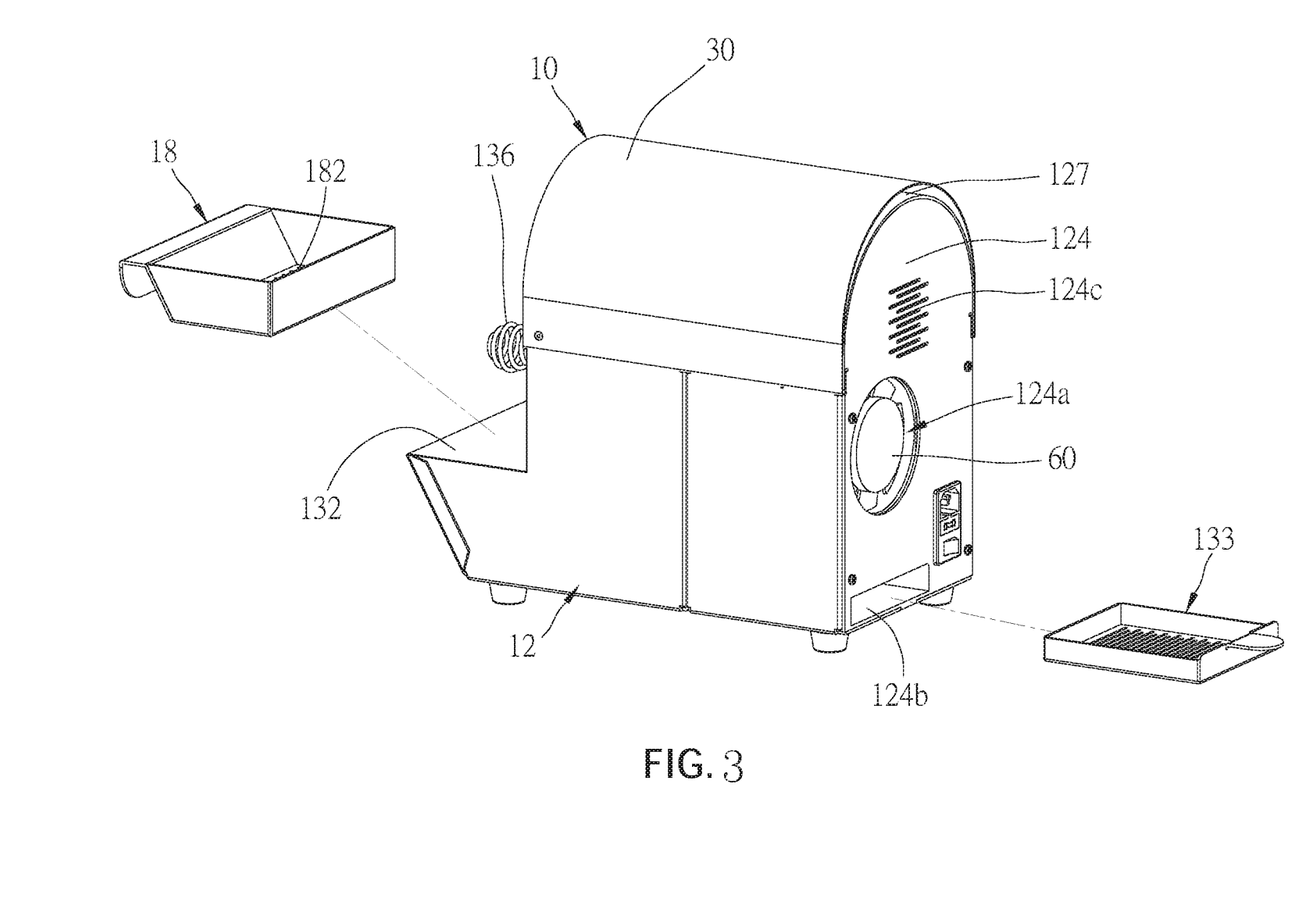
FIG. 3 is an exploded perspective view of a coffee bean roaster of the first embodiment.
Figure 4:
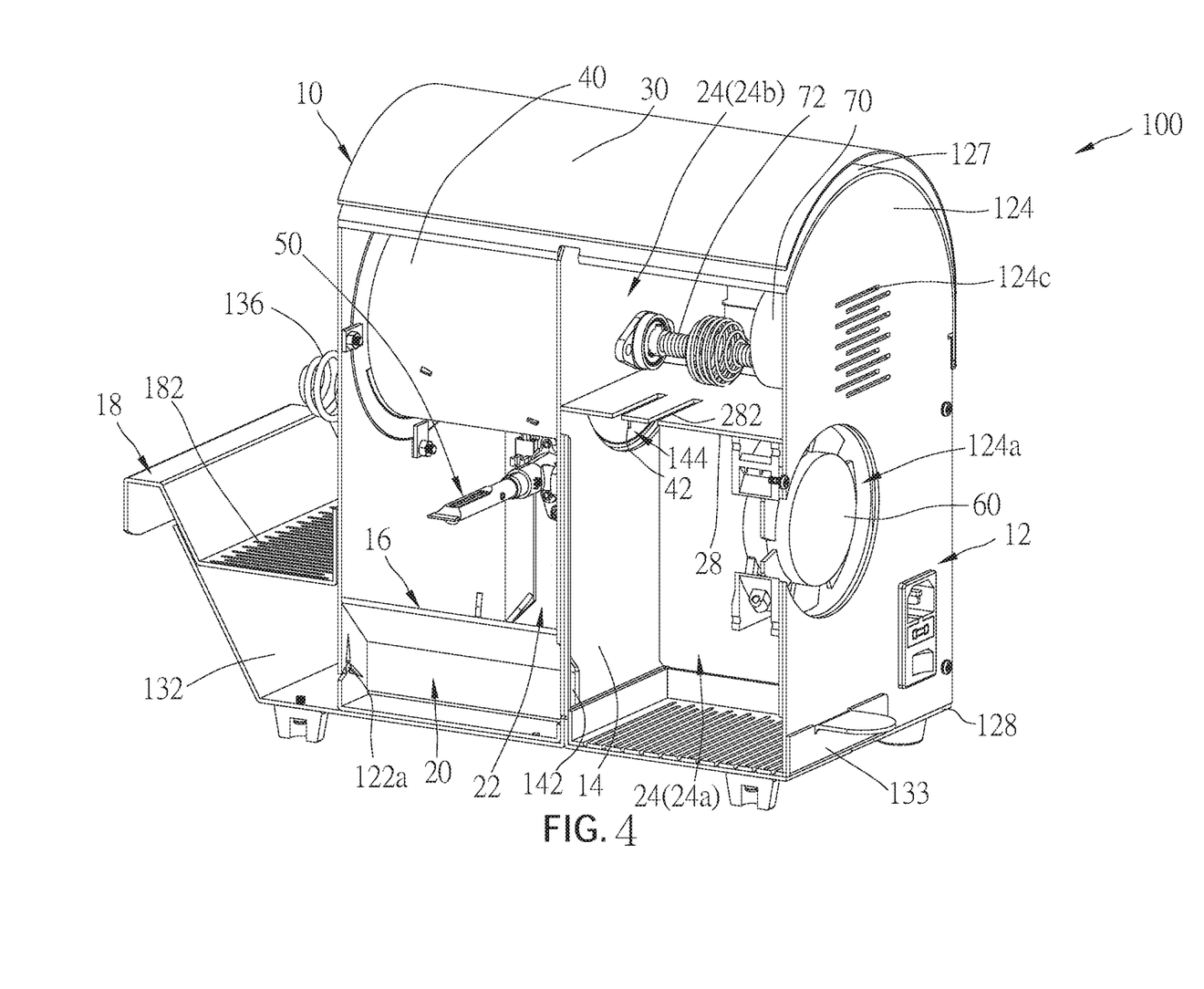
FIG. 4 is a cross-sectional view of FIG. 2 along lines 4-4.
Figure 5:
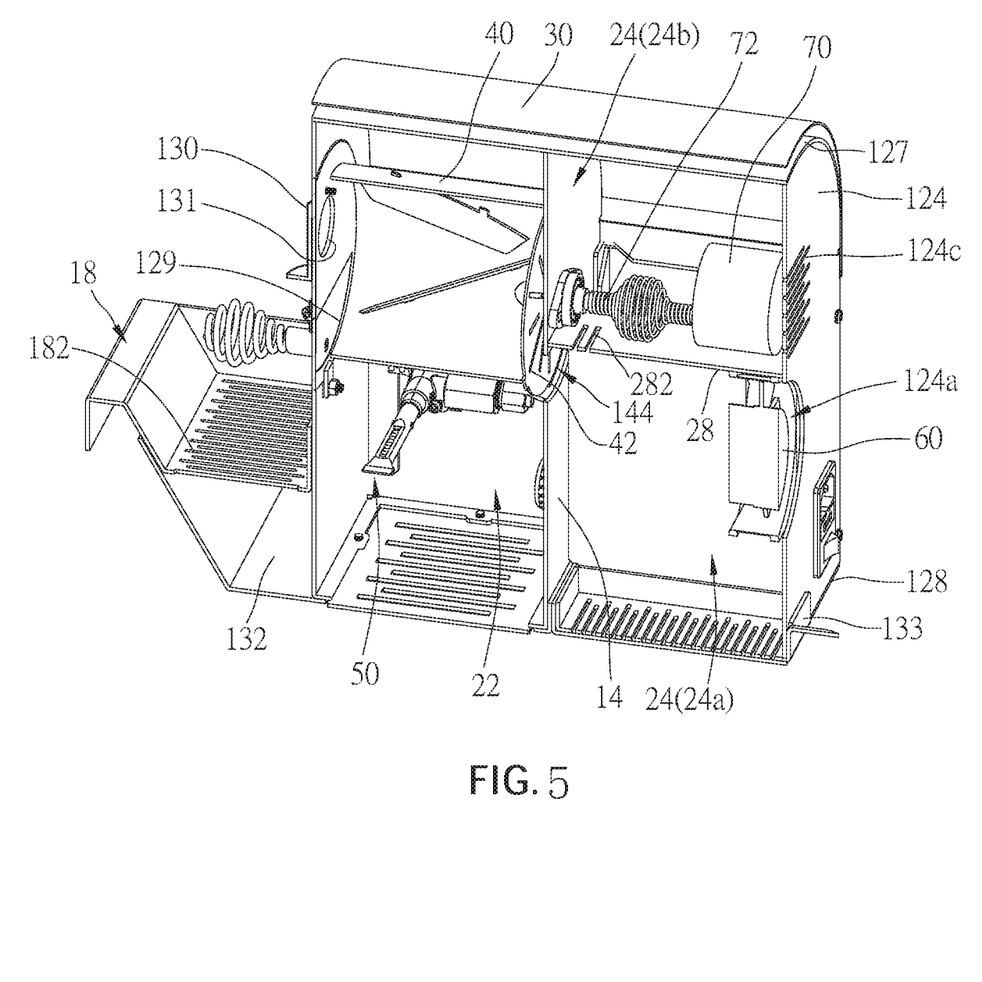
FIG. 5 is a cross-sectional view of FIG. 2 along lines 5-5.
Figure 6:
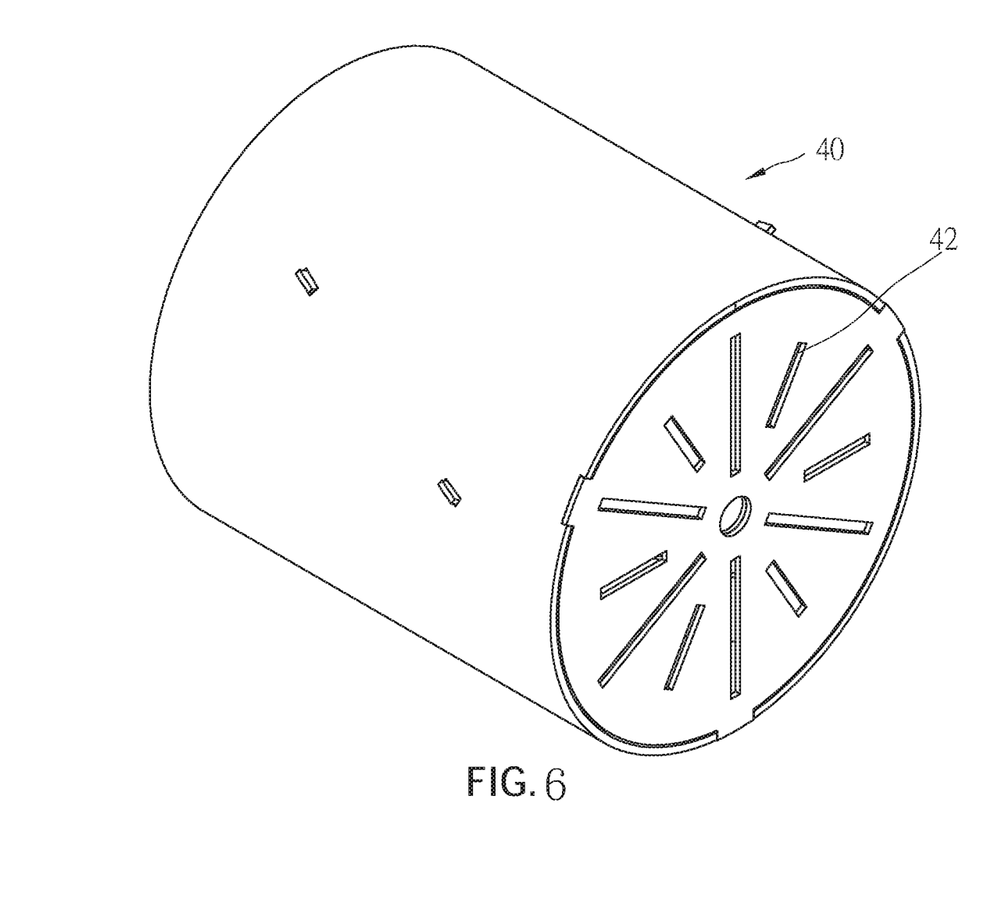
FIG. 6 is a perspective view of a roasting drum of the first embodiment.

As illustrated in FIG. 3, the rear board 124 is provided with an exhaust vent 124a communicating with the inside of the casing 12. In the current embodiment, the rear board 124 is further provided with a plurality of air vents 124c and an opening 124b, the plurality of air vents 124c being disposed above the exhaust vent 124a while the opening 124b being disposed below the exhaust vent 124a. In one embodiment, the rear board 124 may provide with at least one air vent 124c. The two first side boards 125 are connected to two sides of the front board 122, and the two second side boards 126 are connected to two sides of the rear board 124. Each of the first side boards 125 includes a main board section and an extended board section, and each of the main board section is connected to each of the corresponding second side boards 126 to form a side wall of the casing 12. In the current embodiment, the extended board sections of the two first side boards 125 extend respectively to the front of the front board 122.

The top board 127 is arc-shaped, and the top board 127 and the bottom board 128 respectively connected to the top and the bottom of the front board 122, the rear board 124, the two first side boards 125, the two second side boards 126.

The partition assembly is disposed inside the casing 12 and partitions the inside of the casing 12 into a first chamber 20, a second chamber 22 and a third chamber 24. More specifically, the partition assembly includes a first partition board 14 and a second partition board 16. The first partition board 14 is disposed between the front board 122 and the rear board 124 is connected to the top board 127 and the bottom board 128 and partitions the inside of the casing 12 into a front half and a rear half. The second partition board 16 is disposed between the first partition board 14 and the front board 122, and the front side of the second partition board 16 is connected to the front board 122 while the rear side thereof is connected to the first partition board 14. Thereby, a space between the first partition board 14 and the front board 122 is partitioned into the first chamber 20 below and the second chamber 22 above, and the first chamber 20 does not communicate with the second chamber 22 directly. The third chamber 24 is formed between the first partition board 14 and the rear board 124 and the first partition board 14 has at least one second air hole 142 and an opening 144, the second air hole 142 being for communicating with the first chamber 20 and the third chamber 24.

The partition assembly in the current embodiment further includes a third partition board 28 which is transversely disposed in the third chamber 24 between the first partition board 14 and the rear board 124 for partitioning the third chamber 24 into a first space 24a below and a second 24b above. The third partition board 28 has at least one penetrating hole 282 for communicating with the first space 24a and the second space 24b.

The first space 24a of the third chamber 24 communicates with the exhaust vent 124a and the opening 124b while the second space 24b thereof communicates with the air vents 124c. In practice, the third partition board 28 may not be provided.

The receiving trough 132 is disposed outside the front board 122. In the current embodiment, the extended board sections of the two first side boards 125 connect to a front plate to form the receiving trough 132. The receiving trough 132 has an upwardly facing upper opening and communicates with the first chamber 20 of the casing 12 through the first air hole 122a.

The container 18 is detachably disposed in the receiving trough 132 and has a plurality of mesh holes 182 that communicate with the receiving trough 132.

In the current embodiment, the machine body 10 further includes a collecting case 133 that movably pass through the opening 124b of the rear board 124 into the first space 24a of the third chamber 24 and a top opening of the collecting case 133 is located outside the at least one second air hole 142 of the first partition board 14.

The machine body 10 further includes a cover 30 disposed above the top board 127 so users are prevented from touching the top board 127.

Figure 1:
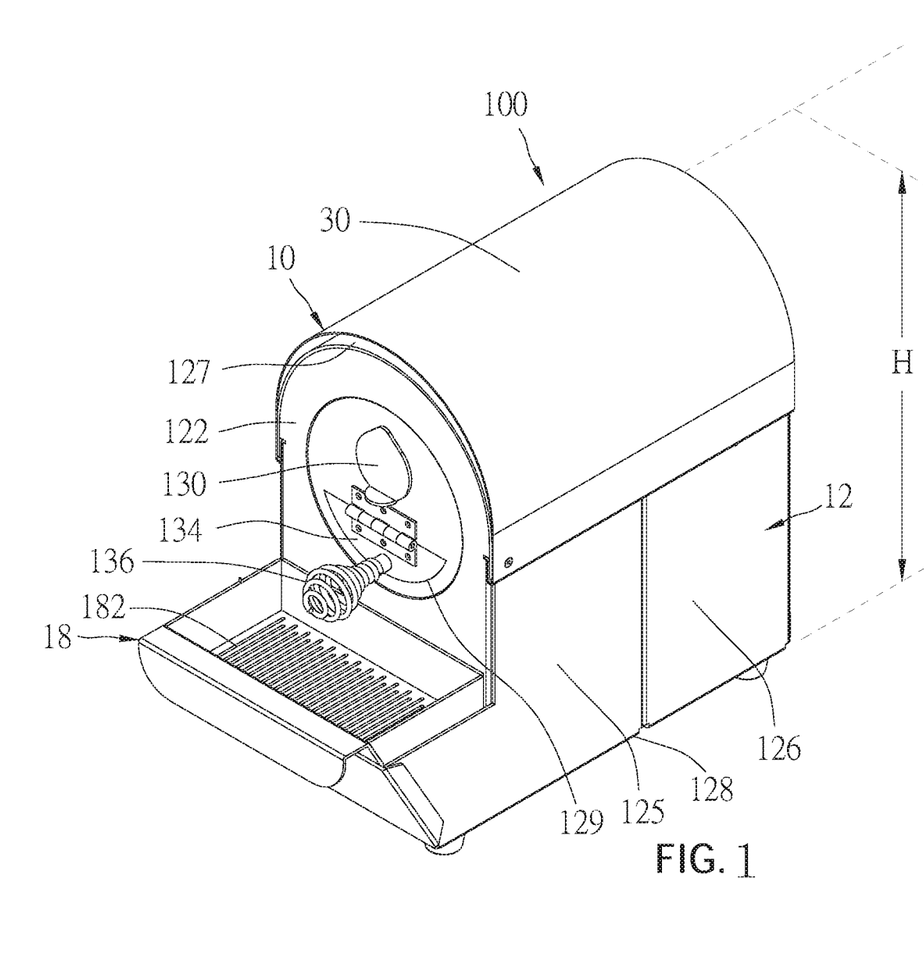
FIG. 1 is a perspective view of a coffee bean roaster of a first embodiment according to the present invention.
Figure 2:
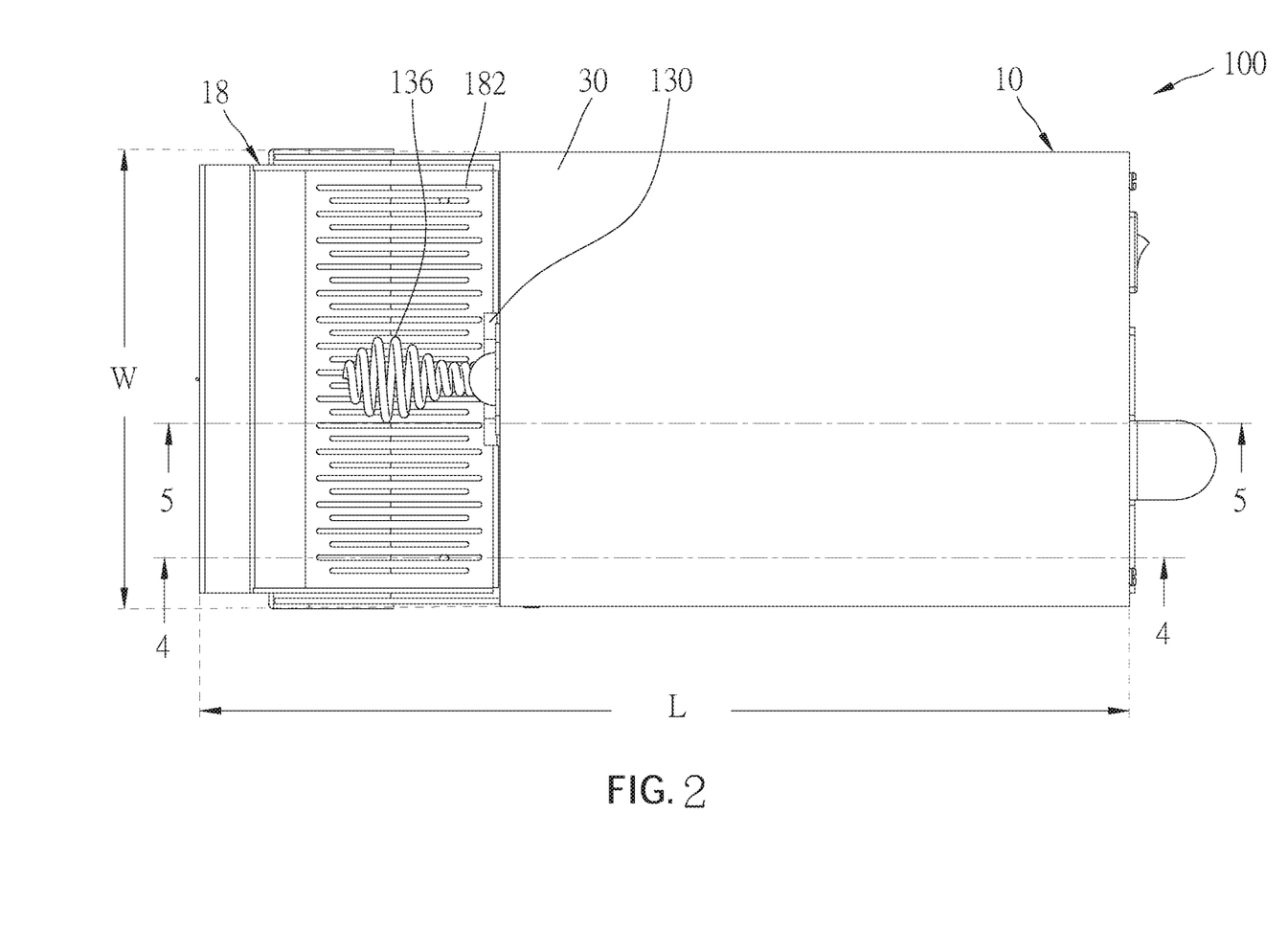
FIG. 2 is a top view of a coffee bean roaster of the first embodiment.

Referring to FIG. 1 and FIG. 2, a length L, a width W and a height H are defined in the coffee bean roaster 100, wherein the length L is a distance from a foremost end of the container 18 to an outer surface of the rear board 124, the width W is a distance between outer surfaces of the two first side board 125, and the height H is a distance from a highest point of the cover 30 to a bottom surface of the bottom board 128. In the current embodiment, the coffee bean roaster 100 has the length L of 369.2 mm, the width W of 180 mm and the height H of 282.5 mm. In practice, the length L can be between 281 and 423 mm, the width W can be between 144 and 216 mm, and the height H can be between 226 and 338 mm. In the confined space of the coffee bean roaster 100, the partition assembly is to partition the inside of the casing 12 into the first chamber 20 and the third chamber 24 that communicate with each other to form an airflow passage.

The roasting drum 40 is rotatably disposed inside the second chamber 22, wherein a front end of the roasting drum 40 is open and corresponds to the material outlet 129 of the front board 122 and the material inlet 131 thereof, such that the material outlet 129 and the material inlet 131 communicate with the inside of the roasting drum 40. In practice, an inner diameter of the roasting drum 40 can be between 3 and 6 inches (between 76.2 and 152.4 mm); in the current embodiment, the inner diameter of the roasting drum 40 is 3.5 inches (88.9 mm). A rear end of the roasting drum 40 has a plurality of through holes 42 (shown in FIG. 6) that communicate with the first space 24a of the third chamber 24 through the opening 144 of the first partition board 14. A driving motor 70 is disposed in the second space 24b and is connected to the roasting drum 40 by a coupling 72 to drive the roasting drum 40. The coupling 72 is disposed above the penetrating hole 282 of the third partition board 28 while the driving motor 70 is disposed adjacent to the air vents 124c.

The heating device 50 is disposed inside the second chamber 22 of the casing 12 and below the roasting drum 40. In the current embodiment, the heating device 50 burns gas for heating the roasting drum 40.

The fan module 60 is disposed in the third chamber 24, more specifically, the fan module 60 attached on an inner side of the rear board 124 by means of screwing in, gluing and welding. In practice, the fan module 60 can be disposed on an outer side of the rear board 124.

Figure 7:
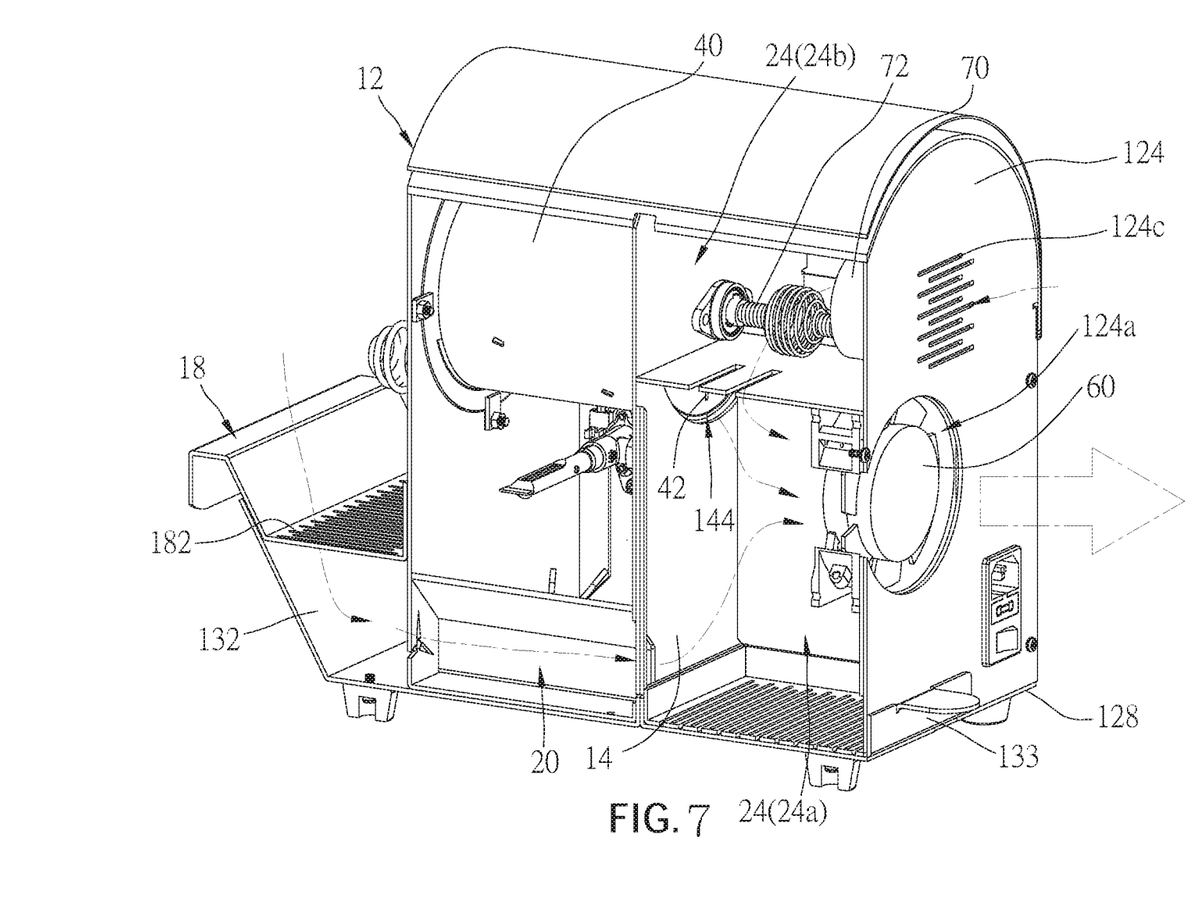
FIG. 7 is a schematic view showing the flow direction of the airflow of each chamber.

As illustrated in FIG. 7, switch on the heating device 50 to heat the roasting drum 40, turn on the driving motor 70 to rotate the roasting drum 40, and turn on the fan module 60, after that, put coffee beans into the roasting drum 40 through the material inlet 131 to start roasting. During the roasting process, with the fan module 60 pumping air, the exhaust air generated by coffee beans in the roasting drum 40 is discharged to the exhaust vent 124a of the rear board 124 of the casing 12 via the through holes 42 of the roasting drum 40, the opening 144 of the first partition board 14 and the first space 24a of the third chamber 24. The chaff produced during the roasting process is also discharged into the first space 24a of the third chamber 24 and falls in the collecting case 133.

In addition, when the roasting drum 40 is heated by the heating device 50, the heat generated by the heating device 50 is conducted from the roasting drum 40 through the coupling 72 to the driving motor 70, and meanwhile, the driving motor 70 in operation generates heat as well. Therefore, with the fan module 60, the external cold air is drawn into the second space 24b through the air vents 124c of the rear board 124 and enters the first space 24a through the penetrating hole 282 of the third partition board 28. Thereby, the external cold air not only cools the second space 24b, the coupling 72 and the driving motor 70 to avoid the damage of the driving motor 70 out of overheating, but also keeps the second space 24b at an appropriate temperature so users are prevented from touching the casing 12 and inadvertently getting burnt during the process of roasting. The external cold air also cools the first space 24a of the third chamber, such that the temperature of the airflow exhausted from the exhaust vent 124a is not too high. It is worth mentioning that the cold air above the container 18 also passes through the mesh holes 182 of the container 18, the receiving trough 132, the first chamber 20 into the third chamber and cools the first space 24a of the third chamber 24, such that the temperature of the airflow exhausted from the exhaust vent 124a is not too high.

Figure 8:
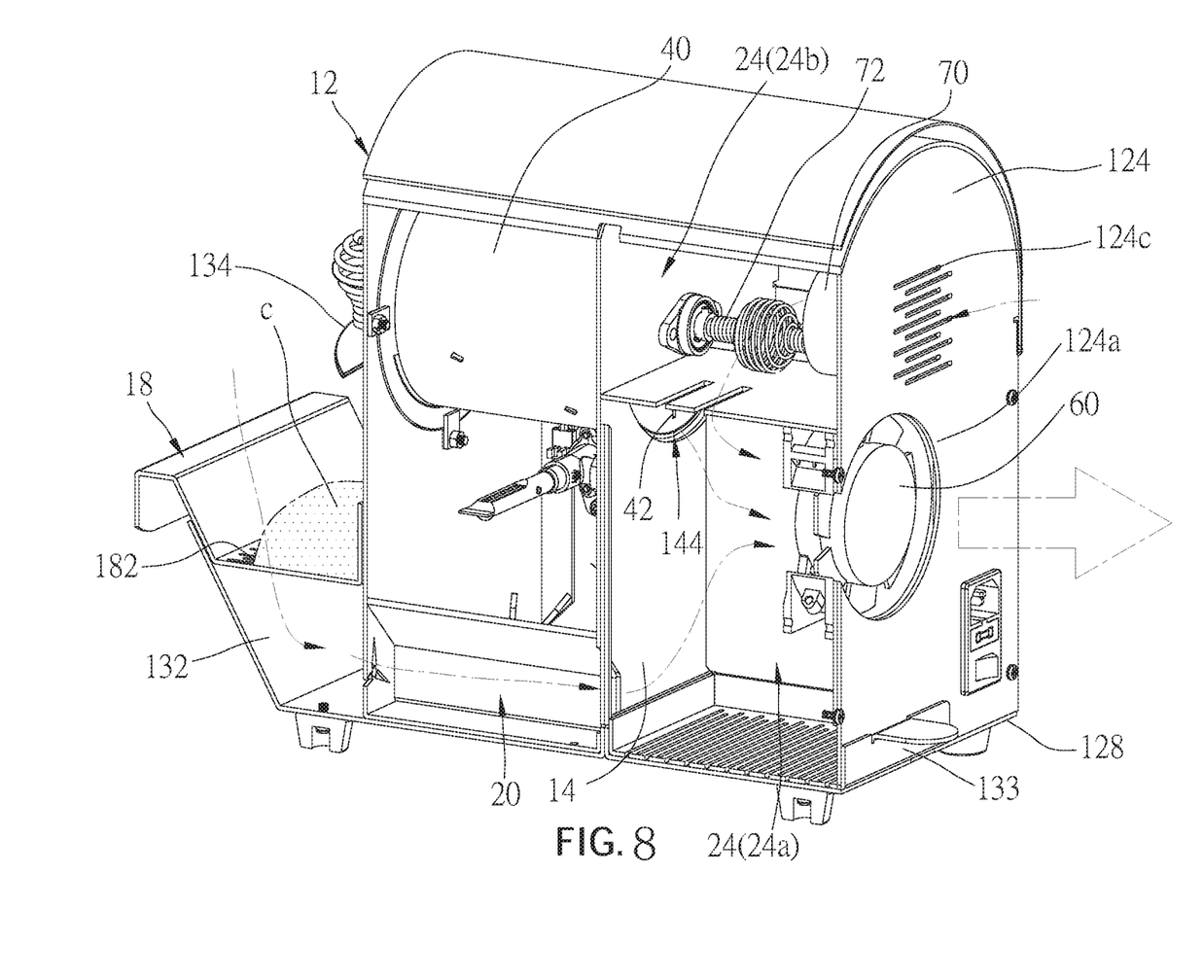
FIG. 8 is a schematic view showing the flow direction of the airflow of ripened coffee beans in the container.

As illustrated in FIG. 8, when coffee beans C in the roasting drum 40 are roasted, open the discharging baffle 134 and coffee beans C fall into the container 18 through the material outlet 129. When the residual chaff falls into the receiving trough 132 through the mesh poles 182, the residual chaff is pumped by the fan module 60 into the collecting case 133 of the third chamber 24 through the first air hole 122a and the first chamber 20. The newly roasted coffee beans C gather together, and the heat is concentrated in the container 18. The operation of the fan module 60 accelerates the external air flowing through the coffee beans C in the container 18 and then drawn to the outside of the casing 12 by the communication of the receiving trough 132, the first chamber 20, the third chamber 24 and the exhaust vent 124a. The flow of the airflow rapidly reduces the temperature of the coffee beans C, and the residual chaff falling in the receiving trough 132 is taken away into the collecting case 133.

According to the aforementioned, the confined space in the casing is partitioned into the first chamber and the third chamber by the partition assembly to form the airflow passage in the casing, thereby efficiently solve the problem of exposing ducts of the conventional coffee bean roaster to the outside. The benefit of the present invention is also to miniaturization of coffee bean roasters. To dispose the fan module inside the casing not only makes the appearance of the machine body more aesthetic and integrated but is also favorable to minimize the volume thereof.

It must be pointed out that the embodiments described above are only some embodiments of the present invention. All equivalent structures which employ the concepts disclosed in this specification and the appended claims should fall within the scope of the present invention.

What is claimed is:

1. A coffee bean roaster comprising:
   a machine body including a casing, a partition assembly, a receiving trough and a container, wherein the partition assembly is disposed inside the casing and partitions an inside of the casing into a first chamber, a second chamber and a third chamber; the casing has a material outlet; the receiving trough is disposed outside the material outlet and communicates with the first chamber; and the container is disposed in the receiving trough and has a plurality of mesh holes communicating with the receiving trough;
   a roasting drum rotatably disposed inside the second chamber of the casing, wherein one side of the roasting drum corresponds to the material outlet and the other side of that has a plurality of through holes communicating with the third chamber;
   a heating device disposed inside the second chamber of the casing for heating the roasting drum; and
   a fan module attached to the casing for pumping air from the first chamber through the third chamber to an outside of the casing.

2. The coffee bean roaster of claim 1, wherein the casing includes a front board and a rear board, the front board having at least one first air hole at a bottom thereof; the receiving trough communicating with the first chamber through the at least one first air hole; the container disposed in front of the front board; the rear board having an exhaust vent to which air is exhausted by the fan module.

3. The coffee bean roaster of claim 2, wherein the fan module is disposed in the third chamber and corresponds to the exhaust vent.

4. The coffee bean roaster of claim 2, wherein the partition assembly includes a first partition board and a second partition board, the first partition board disposed between the front board and the rear board, the second partition board connecting the front board and the first partition board and partitioning a space which is between the front board and the first partition board into the first chamber and the second chamber while the third chamber formed between the first partition board and the rear board, and the first partition board having at least one second air hole for communicating with the first chamber and the third chamber.

5. The coffee bean roaster of claim 4, wherein the first partition board has an opening by which the through holes of the roasting drum communicate with the third chamber.

6. The coffee bean roaster of claim 4, further comprising a driving motor connected to the roasting drum, wherein the partition assembly includes a third partition board which is disposed between the first partition board and the rear board for partitioning the third chamber into a first space and a second space, the third partition board having at least one penetrating hole for communicating with the first space and the second space; wherein, the exhaust vent communicates with the first space and the casing having an air vent communicating with the second space; the driving motor disposed in the second space.

7. The coffee bean roaster of claim 6, wherein the rear board has the air vent.

8. The coffee bean roaster of claim 6, wherein the fan module is disposed in the first space.

9. The coffee bean roaster of claim 4, wherein the machine body comprises a collecting case; a bottom of the rear board having an opening communicating with the third chamber and the outside of the casing, the collecting case movably passing through the opening of the rear board into the third chamber and a top opening of the collecting case located outside the at least one second air hole.

* * * * *